Dec. 28, 1937.  H. R. MURRAY  2,103,376
APPLIANCE FOR PREPARING BODIES FOR BURIAL
Filed May 18, 1936
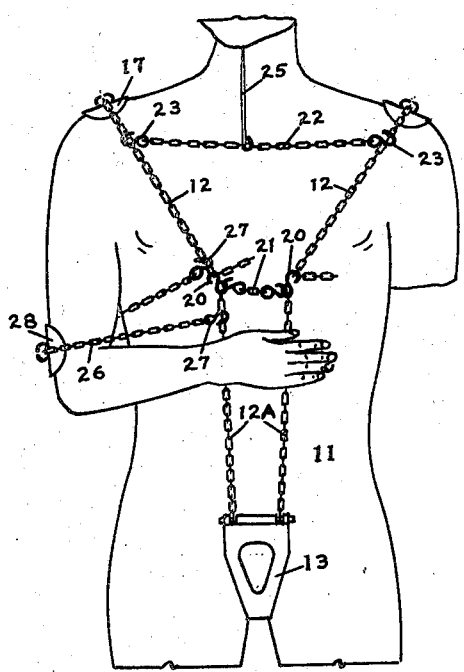
FIG. 1
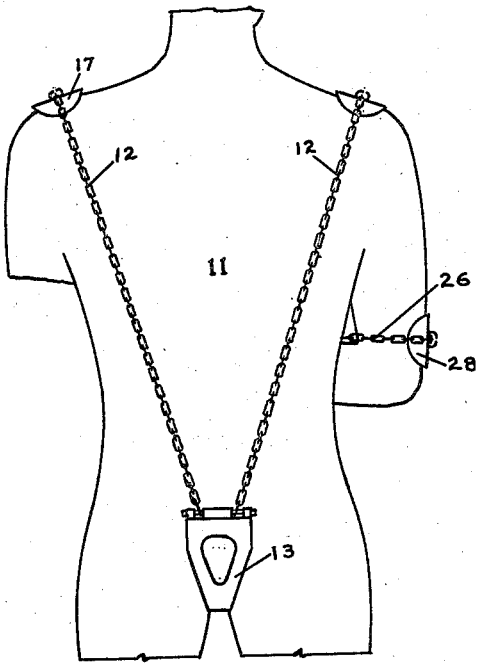
FIG. 2
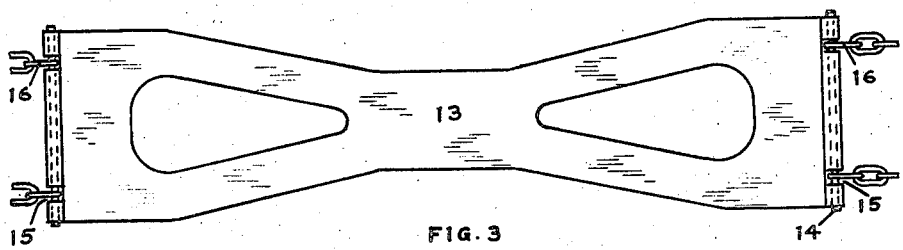
FIG. 3
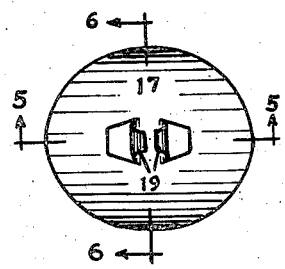
FIG. 4
FIG. 5
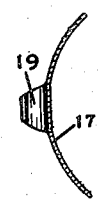
FIG. 6
FIG. 7
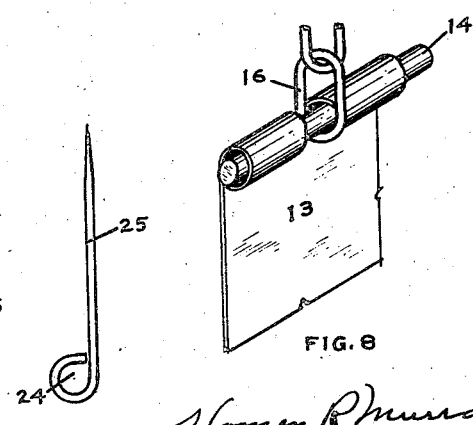
FIG. 8
Homer R Murray
INVENTOR Patented Dec. 28, 1937

2,103,376

UNITED STATES PATENT OFFICE 2,103,376

APPLIANCE FOR PREPARING BODIES FOR BURIAL

Homer R. Murray, Fairfield, Iowa

Application May 18, 1936, Serial No. 80,320

6 Claims. (Cl. 27—1)

My invention relates to improvements in appliances for preparing bodies for burial and has particular relation to that type of appliance used in preparing a human body so it will not be in a distorted position after being embalmed.

After death, there is practically always a tendency in the human body for the shoulder portions to be raised above their normal position, due to a part of the body weight having been directly on the shoulders or on the shoulder blades. This condition is intensified as the body lies on the preparation table. As rigor mortis sets in, the muscles and leaders are stiffened with certain parts out of their normal place, thereby distorting the body, a condition which should be corrected before the fluid for embalming is injected into the body.

The objects of the invention are to provide such an appliance for restoring and maintaining the body in a lifelike position until it is embalmed; to provide an appliance that will not obstruct the circulatory system in the body so as to prevent the embalming fluid from passing therethrough; and to provide an appliance to prevent distortion of the body as the fluid is being injected therein.

Further objects and advantages of the invention will appear from a consideration of the following description in conjunction with the accompanying drawing in which—

Figs. 1 and 2 are front and rear views respectively of a torso having the appliance thereon.

Fig. 3 is a front view of a crotch-engaging member in unfolded position.

Fig. 4 is a plan view of a shoulder-engaging member.

Figs. 5 and 6 are sectional views of the same taken on the lines 5—5 and 6—6 respectively.

Fig. 7 is a side view of a chin-engaging member.

Fig. 8 is a detailed view showing a pin and the manner of attaching certain members to the crotch-engaging member.

Referring to the drawing, it shows a torso 11 having flexible members 12 extending over the shoulders of the torso. The members 12 may be made of any suitable material and for this purpose I employ chains, as they are easily handled and can be adjusted in a variety of positions. With my appliance, the muscles of the body are manipulated and the body made to assume a life-like position. The members 12 are then placed over the shoulders of the body and the ends thereof anchored so that the members 12 are under tension and the shoulders are thereby drawn down and held in that position. The members 12 may be anchored in a number of ways and I have shown a preferred form in the drawing wherein the members 12 are fastened to a flexible crotch-engaging member 13. In Fig. 3 of the drawing the member 13 is shown in an unfolded or straightened position before being flexed and placed in the crotch of the torso. The ends of the member 13 are rolled so as to permit a pin 14 to be inserted therein and through the rolled position. Slotted openings 15 are provided in the rolled portion of the member 13 and a link 16 of the chain 12 is placed in each slot so that the pin 14 will engage the link when inserted through the rolled portion.

The chain 12 is secured to one end of the member 13 in the manner above described and then passed over the shoulders of the body, drawn tight and then fastened to the opposite end of the member 13, and in this manner the shoulders are drawn down and back to their natural position and so held during the process of embalming. To prevent creases being made in the shoulders as the chains are tightened, and to prevent the circulatory system from being obstructed, shoulder-engaging members 17 are placed on the shoulders. These members are preferably shaped to conform to the contour of the shoulders and an eyelet 18 is provided thereon through which the chain is passed. In the drawing, Figs. 4 and 5, I have shown the members 17 made of metal having portions 19 punched therein and then folded back to form the eyelet 18.

The chains permit an unlimited range of adjustability so the appliance may be used on bodies of different size. In the drawing, I have shown portions of the chain designated as 12A secured at one end of the member 13 and at the other end provided with hooks 20. When it is desired to maintain the chains 12A in somewhat of a parallel position and to prevent the shoulder-engaging members from slipping off from the shoulders a supplementary chain 21 is secured on the hooks 20, as is shown in the drawing (Fig. 1). In some instances it may be advisable to use the supplementary chain 21 on the reverse side of the body, which may be readily done by placing the portions 12A on the reverse side of the body.

A chain 22 having hooks 23 on each end thereof is passed through the eyelet 24 in a chin-supporting member 25 and the hooks 23 are placed in the links of the chain 12. The pointed end of the member 25 is placed under the chin and against the lower jaw bone of the body and the chin and lower jaw are thereby supported in the proper position. The chain 22 may be moved upwardly or downwardly on the chain 12 and in this manner the proper adjustment is secured for the chin-supporting member 25. An arm support is provided, consisting of a chain 26 having hooks 27 on each end which fasten in the links of the chains 12 and 12A, and this chain is passed through an eyelet secured on an arm-supporting member 28 which is similar to the member 17.

With my appliance, when a body is distorted, occasioned by the stiffening of the muscles and leaders, such muscles and leaders are manipulated sufficiently until they become flexible and the body can be made to assume a lifelike position. The appliance is then placed on the body as has been described herein and the body held in that position by the appliance so the embalming process can be proceeded with and such position maintained as a result of the embalming. In using such an appliance, there is nothing connected therewith that will interfere or block the circulatory system to prevent the fluid from freely passing therethrough. After the body has been embalmed, the appliance may be easily removed by loosening the hooks. It can then be taken apart and the separate chains and members thereof sterilized.

I have described the invention with respect to a preferred form thereof and many changes and modifications may be made therein, and it is desired, therefore, that the invention be limited only to the prior art and the scope of the appended claims.

Having described my invention, what I claim and desire to secure by Letters Patent is:

1. An appliance for preparing bodies for burial comprising flexible members adapted to engage the shoulders of a body and a crotch-engaging member to which the flexible members are fastened under tension, whereby the shoulders may be drawn down and held in position during embalming.

2. An appliance for preparing bodies for burial comprising chains adapted to engage the shoulders of a body, and a crotch-engaging member to which the chains are fastened under tension, whereby the shoulders may be drawn down and held in position during embalming.

3. An appliance for preparing bodies for burial comprising chains having links, said chains being adapted to engage the shoulders of a body, a crotch-engaging member provided with rolled ends having slots therein to receive the links of the chain, and pins to fit in said rolled ends and through the links of the chain to hold the chains in engagement with the crotch-engaging member.

4. An appliance for preparing bodies for burial comprising a crotch-engaging member, a chain secured to one end of the crotch-engaging member having a hook on the opposite end of said chain and a second chain secured to the opposite end of the crotch-engaging member adapted to extend over the shoulders of a body and be fastened on said hook, under tension, whereby the shoulders may be drawn down and held in position during embalming.

5. An appliance for preparing bodies for burial comprising a crotch-engaging member, chains secured to one end of the crotch-engaging member having hooks on the opposite ends of said chains and a second series of chains secured to the opposite end of the crotch-engaging member adapted to extend over the shoulders of a body and be fastened on said hooks, under tension, whereby the shoulders may be drawn down and held in position during embalming.

6. An appliance for preparing bodies for burial comprising a crotch-engaging member, flexible members secured at one end of said crotch-engaging member and adapted to extend over the shoulders of a body and be adjustably secured to the opposite end of said member, and shoulder engaging means associated with said flexible members to prevent creases being made in the shoulders of a body and the circulatory system therein from being obstructed.

HOMER R. MURRAY.